United States Patent
Slezak et al.

(10) Patent No.: US 6,243,842 B1
(45) Date of Patent: Jun. 5, 2001

(54) METHOD AND APPARATUS FOR OPERATING ON A MEMORY UNIT VIA A JTAG PORT

(75) Inventors: Yaron Slezak, Kiriat Motzkin (IL); Yoram Cedar, Cupertino, CA (US); Ilan Wienner, Herzlia (IL)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/093,943

(22) Filed: Jun. 8, 1998

(51) Int. Cl.$^7$ .................................................. G01R 31/28
(52) U.S. Cl. .......................... 714/724; 714/25; 714/725; 714/727; 365/201
(58) Field of Search ............................. 714/718, 25, 727, 714/30, 40, 42, 724, 725, 729, 731; 365/201

(56) References Cited

U.S. PATENT DOCUMENTS

| | | | |
|---|---|---|---|
| 4,426,679 | * 1/1984 | Yu et al. ................................. | 710/17 |
| 5,355,369 | * 10/1994 | Greenbergerl et al. ............... | 714/727 |
| 5,388,248 | * 2/1995 | Robinson et al. ...................... | 365/52 |
| 6,000,051 | * 12/1999 | Nadeau-Dostie et al. ........... | 714/727 |

* cited by examiner

Primary Examiner—Emmanuel L. Moise
(74) Attorney, Agent, or Firm—Theodore E. Galanthay; Lisa K. Jorgenson

(57) ABSTRACT

A method of controlling the operations of an on-chip memory unit includes the steps of receiving an indication of at least the ready or busy state of the memory unit and instructing the memory unit to perform the next operation once the indication is of the ready state. The step of receiving can include the repeated steps of capturing the indication and the data and address information of the previous byte provided to the memory unit and shifting the data and address information of a next byte and at least one extra bit through a shift register such that the indication is also shifted out of the shift register to a data out pin of a JTAG port. The steps of capturing and shifting, which provide double buffering, are repeated until the indication is of the ready state. Alternatively, the step of receiving occurs from a non-JTAG port of the chip to a pin on a receiving port. The present invention includes the chip which can operate according to the steps of the method.

15 Claims, 7 Drawing Sheets

METHOD AND APPARATUS FOR OPERATING ON A MEMORY UNIT VIA A JTAG PORT

FIELD OF THE INVENTION

The present invention relates to Joint Text Action Group (JTAG) ports generally and to their method of operation in particular.

BACKGROUND OF THE INVENTION

Memory units are very common in many different types of products. All memory units are programmable but the types of memory units differ in whether or not and how they are erased. Read only memory (ROM) units are not erasable and require replacement if the information programmed therein must be changed. Erasable programmable, read only memory (EPROM) units use electrical signals to program them but require ultraviolet light to erase the entire chip at once. Electrically erasable programmable, read only memory (EEPROM) units and FLASH EEPROM units use electrical signals for erasing and for programming. Thus, a single bit or a single word can be changed if desired.

Included in the term "memory units" are programmable logic devices (PLDs) which, instead of storing data as do memory units, store logical equations. A PLD can be based on any of the memory unit types.

To reprogram a programmable memory unit, the unit must be placed into a programming device which erases the unit in the appropriate manner and then electrically programs the unit. For memory units formed in a chip which is connected to a circuit board via a socket, this is not a problem since the units are typically removable from the socket.

However, those units which are directly soldered to the circuit board and those which are formed within a multi-function chip cannot be removed to the programming device. These units can be operated on (i.e. read, programmed, erased, verified, etc.) via a parallel port.

In-system programming (ISP) provides a method of operating on an on-chip memory unit, or any non-removable memory unit. IEEE Standard 1149.1 defines a test access port, known as a "JTAG port", through which in-system programming occurs using a serial channel. FIGS. 1A and 1B, to which reference is now made, illustrate the JTAG port and its operation. FIG. 1A illustrates a personal computer (PC) 10 having a parallel port 11 which controls a chip 12 having a JTAG port 14 while FIG. 1B illustrates the method of operation, in the form of a state machine, through the JTAG port 14.

In order to operate with a JTAG port, the chip 12 must also have a JTAG controller 16 which converts the serial data transmitted through the port to the parallel format needed for accessing the memory unit, labeled 18, via a parallel bus 20. The bus can either be a single bus for data and address signals or two busses, one for data signals and one for address signals. In addition, the JTAG controller 16 decodes the instructions sent to into control signals for controlling the operation of the memory unit 18. These control signals are provided to the memory unit 18 via a control bus 29.

The JTAG port 14 has four pins, one each for the clock signal TCK, a control signal TMS, a data in signal TDI and a data out signal TDO, and the JTAG controller 16 includes a state machine 22, a data shift register 24, an instruction shift register 27 and an instruction decoder 28.

The data in signal TDI is a serial presentation of the data and address information to be provided to the memory unit 18 as well as of the instructions to the memory unit 18. The data and address information is provided to data shift register 24 which shifts in the serial data provided by signal TDI. The data shift register 24 thus has enough storage units to hold both data (typically of 8 bits) and address (typically of 16 bits). The instructions are provided to the instruction shift register 27.

Via parallel port 11, the PC 10 provides the clock signal TCK and the control signal TMS to the state machine 22 which, in turn, controls the operation of the JTAG controller 16. Accordingly, the PC 10 also drives the data in signal TDI and monitors the data out signal TDO. The various instructions forming the control signal TMS are indicated in FIG. 1B. As the operation of the JTAG controller 16 is fully defined in the IEEE standard 1149.1, the following discussion will only highlight portions of the operation.

Initially, whatever information is on bus 20 is captured (state 32) and placed into data shift register 24. The data and address information of data in signal TDI is then shifted (state 34) into data shift register 24, causing the captured data to be shifted out, as data out signal TDO. Once a full set of data and address information has been shifted into data shift register 24, the state machine 22 indicates (state 42) to data shift register 24 to provide the data to parallel bus 20. State machine 22 then indicates (state 44) to the instruction decoder 28 to provide the instructions, via control bus 29, to memory unit 18 to run the desired operation (reading, programming, erasure, verification, etc.) for the address.

PC 10 then waits a predetermined length of time T, as defined for each type of operation, before transmitting the next series of data and address bits. The length of time is set to ensure that the desired operation finishes before the next set of data is shifted in.

The timing is shown in FIG. 1C for two bytes, labeled BYTE 0 and BYTE 1. The shifting operation for BYTE 0, as indicated by the data in TDI signal, occurs first, during which the 24 data and address bits are shifted into data shift register 24 and 24 blank bits are shifted out to data out signal TDO. Once the data has been shifted into register 24, the state machine 22 moves to the UPDATE state 42 after which the state machine moves to the run-test/idle state 44 in which an R-T-I pulse 45 is generated. The memory unit 18 then performs the operation, as indicated by the OPERATION signal. As noted, the OPERATION signal returns to its non-active state well within the period of length T allotted to it. The process repeats itself with the next shift operation, for BYTE 1, during which the data of BYTE 0 is shifted out to data out signal TDO.

It will be appreciated that using the JTAG port 14 to operate on a memory unit is time consuming due to the serial transfer of the data and the long wait until the operation has finished for each byte.

SUMMARY OF THE INVENTION

An object of the present invention is to provide a novel method of controlling the operation of an on-chip memory unit through a JTAG port.

Therefore, in accordance with a preferred embodiment of the present invention, the method of controlling the operations of an on-chip memory unit includes the steps of receiving an indication of at least the ready or busy state of the memory unit and instructing the memory unit to perform the next operation once the indication is of the ready state.

In accordance with a preferred embodiment of the present invention, the step of receiving can include the repeated steps of capturing the indication and the data and address information of the previous byte provided to the memory unit and shifting the data and address information of a next byte and at least one extra bit through a shift register such that the indication is also shifted out of the shift register to a data out pin of a JTAG port. The steps of capturing and shifting are repeated until the indication is of the ready state.

Moreover, in accordance with a preferred embodiment of the present invention, the step of receiving includes the step of providing the indication from a non-JTAG port to a pin on a receiving port of an external processor.

Additionally, in accordance with a preferred embodiment of the present invention, the step of receiving includes the step of waiting until the indication is of the ready state. The waiting can occur by polling the receiving port or by connecting the indication to an interrupt port of an external processor.

There is also provided, in accordance with a preferred embodiment of the present invention, a memory chip which includes a memory unit having a ready/busy output line, a JTAG port, with JTAG input and JTAG output lines, for communicating with an external processor and a JTAG controller for controlling the operations of the memory unit in accordance with instructions from the external processor. The controller includes a shift register, a buffer and a state machine. The shift register is connected to the JTAG input and output lines and has a plurality of storage elements one of which is connected to the ready/busy output line and a multiplicity of which are available for receiving data and address information of a byte of the memory unit from the JTAG input line. The buffer receives the data and address information from the shift register and provides it to the memory unit and the state machine controls the operation of the shift register and buffer and instructs the memory unit to perform the next operation once the ready/busy output line indicates the ready state.

Alternatively, there is also provided, in accordance with a preferred embodiment of the present invention, a memory chip which includes a memory unit having a ready/busy output line, a JTAG port for communicating with an external processor, a non-JTAG port connected to the ready/busy output line for providing at least the ready/busy output line to an external processor and a JTAG controller for controlling the operations of the memory unit in accordance with instructions from the external processor.

Finally, in accordance with a preferred embodiment of the present invention, the non-JTAG port has an open drain output.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Applicants have realized that the memory unit typically has an "end-of-execution" or "ready/busy" (RDY/BSY) signal which indicates whether or not the memory unit is in the desired mode. The present invention takes advantage of this signal to reduce the amount of time required to operate on the on-chip memory unit using the JTAG port.

Furthermore, the present invention shifts in the data and address bits for the next bit while the memory unit performs the desired operation. This double buffering adds to the speed gain of the present invention.

Figure 2:
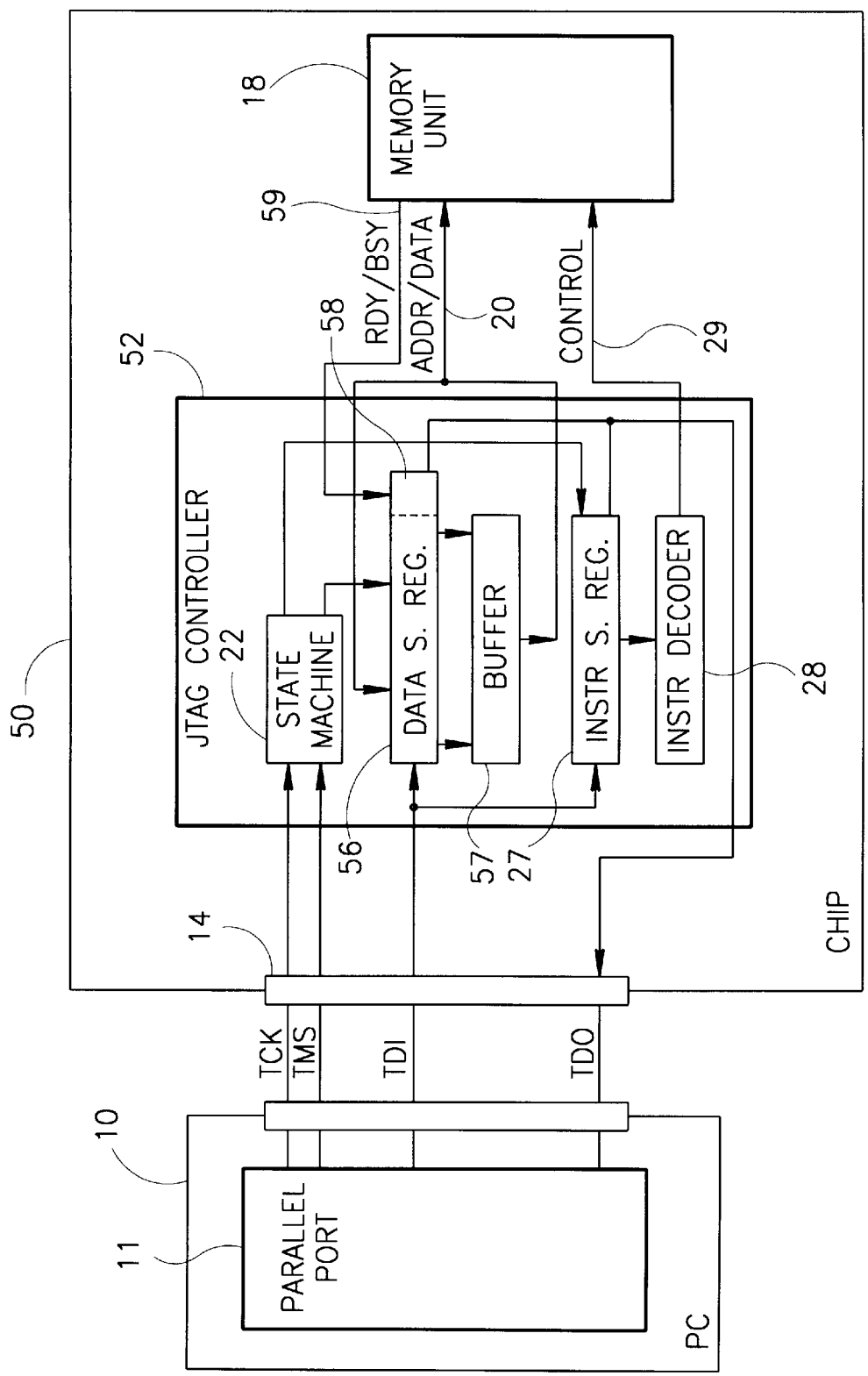
FIG. 2 is a schematic illustration of a memory chip, constructed and operative in accordance with a preferred embodiment of the present invention, and a PC.

Reference is now made to FIG. 2 which illustrates the system of the present invention. The chip 50 includes memory unit 18, a JTAG controller 52, constructed and operative in accordance with a preferred embodiment of the present invention, and a JTAG port 14. In addition, FIG. 2 shows a "ready/busy" (RDY/BSY) output line 59 of memory unit 18.

FIG. 2 shows the operation with PC 10; it will be appreciated that the operation described hereinbelow can occur with any external processor of which PC 10 is only an example. Other types of processors include programmers and automatic tester equipment.

In accordance with a preferred embodiment of the present invention, the JTAG controller 52 includes state machine 22, a buffer 57 and a data shift register, labeled 56. Data shift register 56 typically has at least one extra storage unit 58 more than the number of storage units needed to store the data and address bits. Extra storage unit 58 is connected to the RDY/BSY line 59 and thus, can receive the current state of the RDY/BSY signal. The present discussion will assume only one extra storage unit 58. It will be appreciated that additional extra storage units can be included for capturing other information from the internal blocks of the chip 50.

Figure 1A:
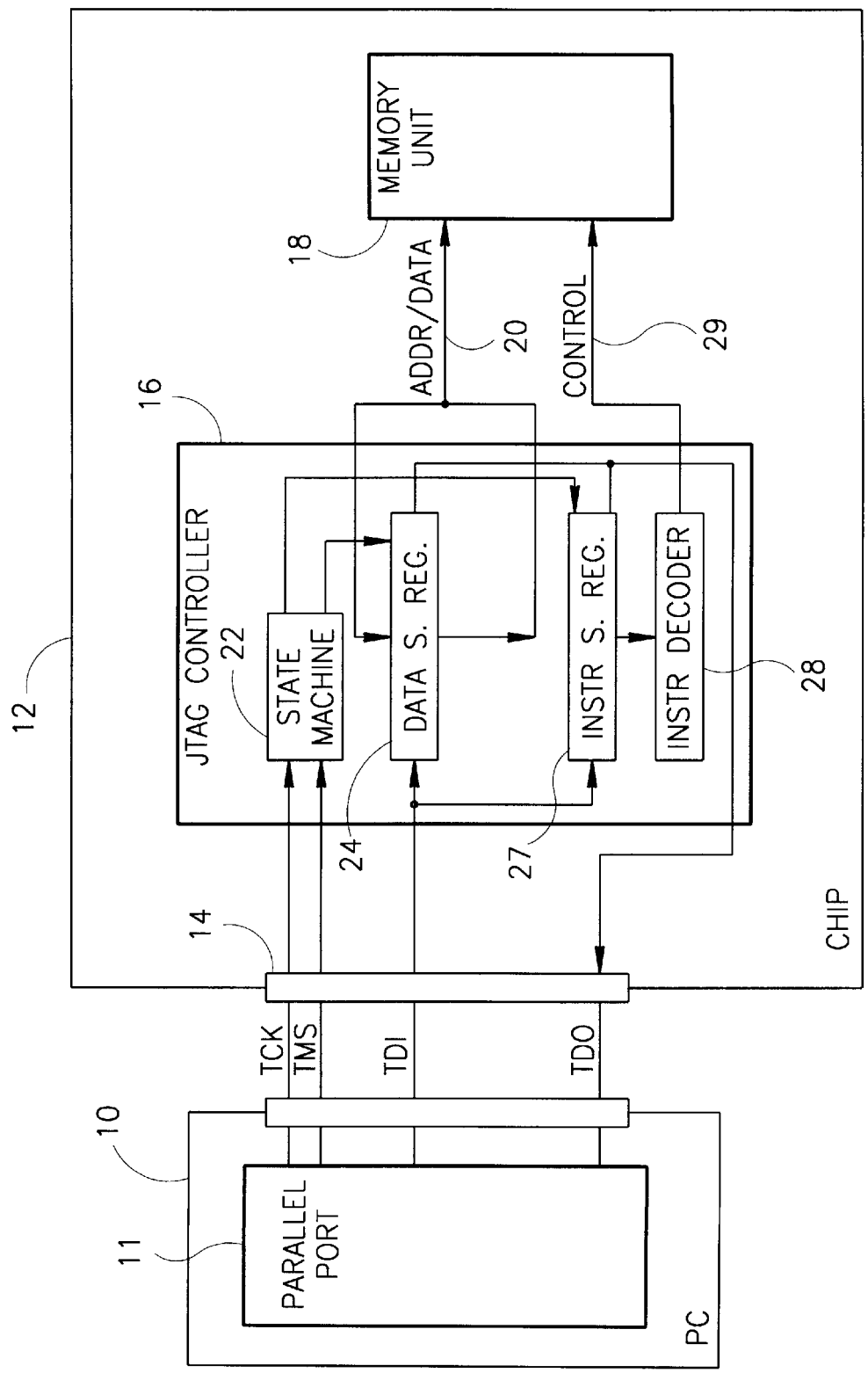
FIG. 1A is a schematic illustration of a prior art memory chip and a PC.
Figure 1B:
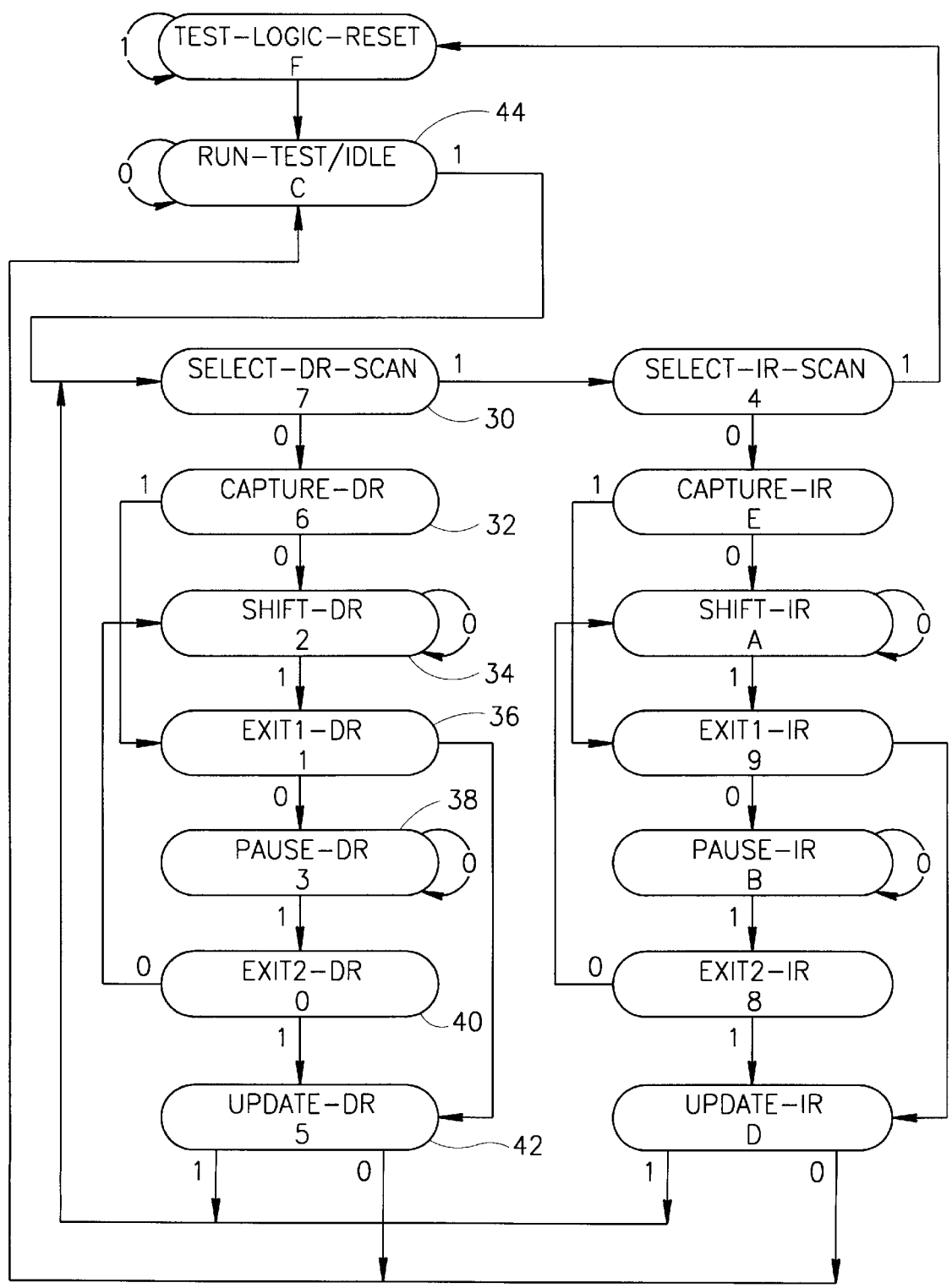
FIG. 1B is a schematic illustration of a state machine useful in the JTAG controller of the prior art.
Figure 1C:
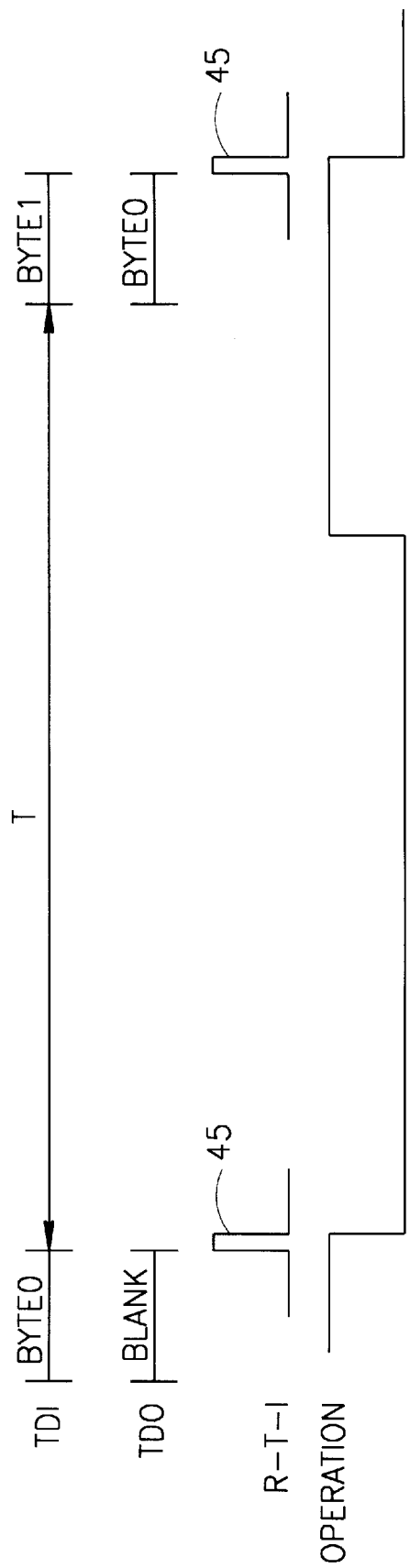
FIG. 1C is a timing diagram illustration of the timing of operations through the JTAG port.

On each cycle to input the address and data information, the JTAG controller 52 first captures (state 32 of FIG. 1B) the current value of the RDY/BSY line 59 and the data and address bits currently found on bus 20 and places the captured information into data shift register 56. The JTAG controller 52 then shifts (state 34 of FIG. 1B) the next byte of the data in TDI signal into data shift register 56. This shifting causes the captured data, including the value in the extra storage unit 58 (FIG. 2), to be shifted out as the TDO data out signal. FIG. 2 shows extra storage unit 58 as the last storage unit of the data shift register 56; however, extra storage unit 58 can be placed anywhere within data shift register 56.

Due to the data shifting, the value of the RDY/BSY signal is periodically provided back to the PC 10. The length of time between values of the RDY/BSY signal is a function of the time it takes to shift in all of the data and address bits and to update (state 42) the buffer 57 with the newly shifted in data. However, the RDY/BSY signal is not provided to the buffer 57.

Once the TDO data out signal receives the RDY/BSY signal which indicates that the memory unit 18 has finished the desired operation, the PC 10 can begin the next desired operation any time thereafter.

Figure 3:
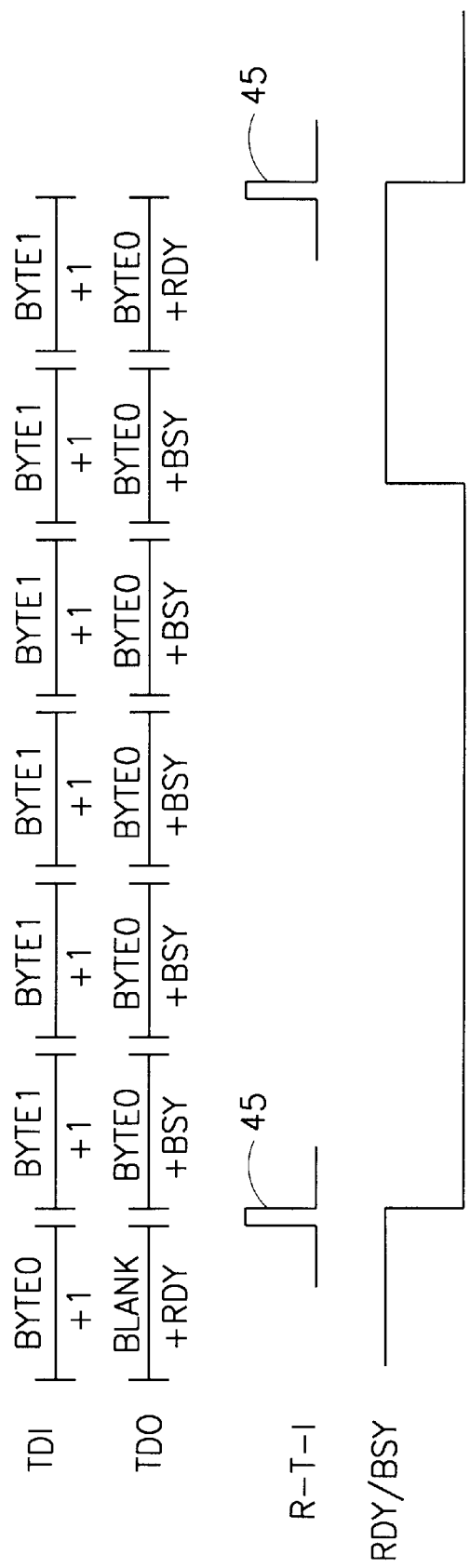
FIG. 3 is a timing diagram illustration of the timing of operations for the memory chip of FIG. 2.

The timing is shown in FIG. 3, to which reference is now made. Initially, the current values of the RDY/BSY signal and of the data and address bits on parallel bus 20 are captured, after which the data in signal TDI shifts the data and address bits for BYTE 0 and an extra bit into data shift register 56. X+1 bits are transferred in, where X is the number of data and address bits and the extra bit is needed to "push" out the RDY/BSY value stored in the extra storage register 58. If there are N extra storage registers 58, then X+N bits are transferred in. For BYTE 0, the data out signal TDO is X blank bits and the RDY value of the RDY/BSY signal.

Once all the data are shifted in and the captured data, including the RDY/BSY value shifted out, the data and address bits are then transferred to buffer 57 in the UPDATE state 42. During the shifting operation (state 34) the PC 10 checks the value of the RDY/BSY signal. Since the memory unit 18 is ready for an operation, the RDY/BSY signal is in the RDY state and thus, the PC 10 moves to the Run-TestIdle state 44. In response, JTAG controller 52 generates an R-T-I pulse 45. The desired operation now begins and the RDY/BSY signal becomes busy (BSY) (e.g. for FIG. 3, the RDY/BSY signal becomes low).

In accordance with a preferred embodiment of the present invention, while the desired operation occurs, the PC 10 continually operates to receive the RDY/BSY status. To do so, the PC 10 first indicates to the JTAG controller 52 to capture the RDY/BSY value and the data and address values currently on the parallel bus 20 into the data shift register 24. PC 10 then shifts in the next byte, BYTE 1, and an extra bit in order to shift out the previous byte, BYTE 0, and the current state of the RDY/BSY signal. FIG. 3 shows the repeated shifting in of BYTE 1 and an extra bit in the data in signal TDI and the repeated shifting out of BYTE 0 and RDY or BSY state in the data out signal TDO. This downloading of the next data to be used, while the memory unit is being operated on, is known as "double buffering".

After each shifting in, the PC 10 orders that the buffer 57 be updated and checks the value of the RDY/BSY signal. In the example of FIG. 3, the RDY/BSY signal becomes ready during the fifth shifting in of the next byte, BYTE 1. Since the RDY/BSY signal is captured prior to the shifting in, the value of the RDY/BSY signal after the fifth shifting in will still be BSY. However, after the sixth shifting in of the data, the RDY/BSY signal will be RDY and the PC 10 can then move to the Run-Test/Idle state 44 to begin a new desired operation.

It will be appreciated that, in the present invention, there is no waiting the predefined period T before shifting in the next data and address information. Rather, the next R-T-I pulse 45 is issued as soon as the RDY signal comes out of the JTAG port. This provides significant time savings since is the period T is defined as the longest possible time it takes to program or erase a byte of the memory 18 and most desired operations take significantly less time than the maximum.

The present invention can also be implemented by waiting Q clock pulses of the TCK signal, at the run-test/idle state 44, before capturing and shifting the data, address and RDY/BSY signals. Q clock pulses occur in significantly less time than the predetermined length of time T. In this embodiment, the PC 10 still waits until the RDY/BSY signal indicates that the memory 18 is ready before beginning the desired operation.

Figure 4:
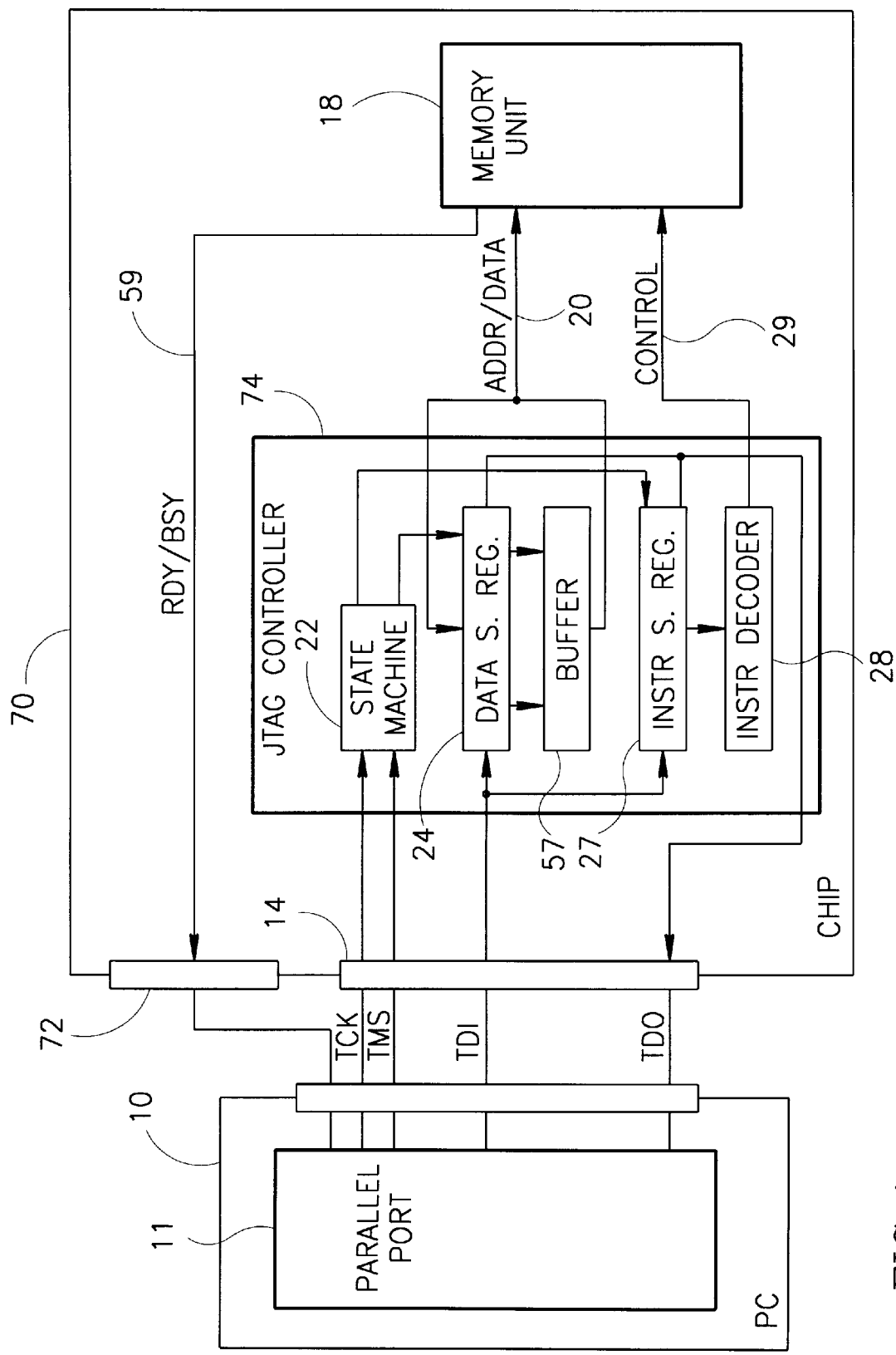
FIG. 4 is a schematic illustration of a memory chip, constructed and operative in accordance with an alternative preferred embodiment of the present invention, and a PC.
Figure 5:
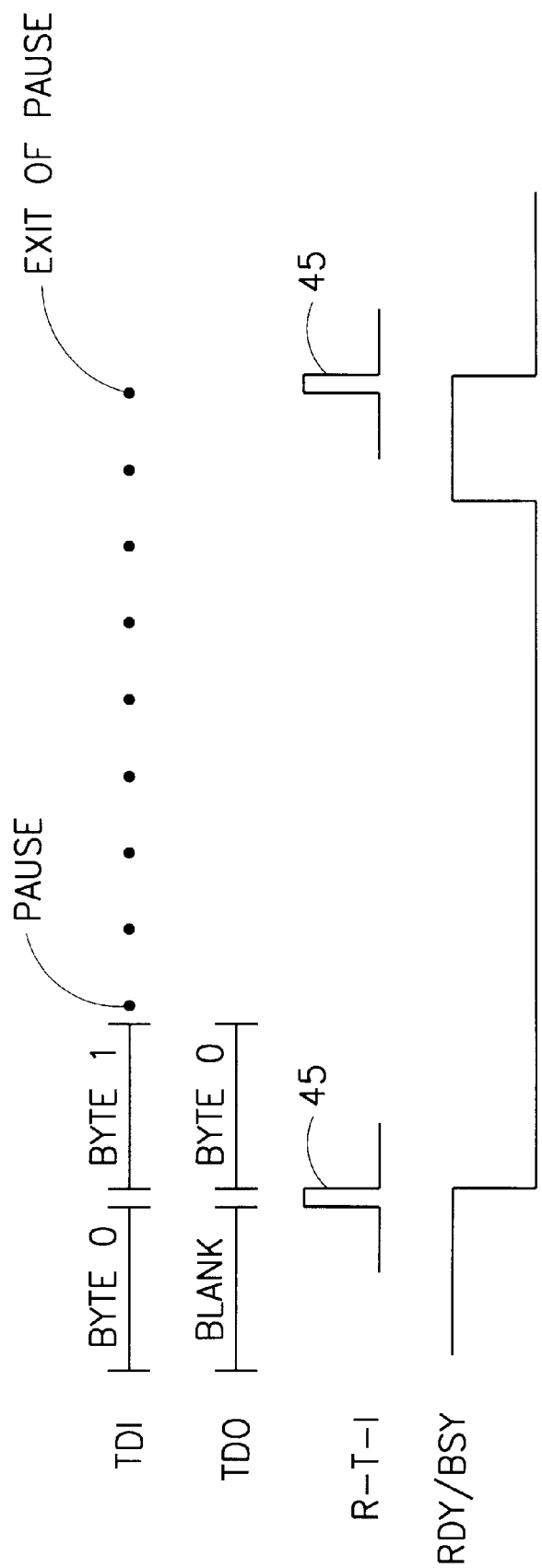
FIG. 5 is a timing diagram illustration of the timing of operations for the memory chip of FIG. 4.

Reference is now made to FIGS. 4 and 5 which illustrate a further alternative embodiment of the present invention in which the RDY/BSY signal is also provided out to a non-JTAG port, labeled 72. FIG. 4 shows the details of the PC 10 and chip, labeled 70 and FIG. 5 is a timing diagram of the operation of the system of FIG. 4. Similar reference numerals refer to similar elements.

As in the prior art, the JTAG controller, labeled 74, includes state machine 22, buffer 57 and data shift register 24, the shift register without any extra storage units. However, in this embodiment, the RDY/BSY signal is provided to one pin of non-JTAG port 72 and this pin is connected to PC 10 via parallel port 11. If desired, the RDY/BSY signal can be provided to an interrupt of the PC 10.

As in the previous embodiments and as shown in FIG. 5, the data and address for the first byte, BYTE 0, is first shifted into data shift register 24 after which it is updated into buffer 57 and then the R-T-I pulse 45 is issued, causing the RDY/BSY signal to become BSY.

In accordance with this embodiment of the present invention, the data and address of the next byte, BYTE 1, is then shifted through data shift register 24, thereby providing double buffering for this embodiment also. The PC 10 moves the state machine 22 to the PAUSE state 38 (FIG. 1B) until the RDY/BSY signal changes to the RDY state, as received directly through port 72. If the RDY/BSY signal is provided to an interrupt of the PC 10, then, as soon as the RDY/BSY signal changes state, the PC 10 will move the state machine 22 out of the PAUSE state 38.

Since the data and address of the next byte, BYTE 1, is already shifted into data shift register 24, PC 10 can then move the state machine 22 from PAUSE state 38 to the EXIT2 state 40 to the UPDATE state 42. This is also indicated in FIG. 5 as part of the TDI signal. Once the UPDATE has finished (i.e. once the data and address bits are transferred to buffer 57), the PC 10 moves to the Run-Test/Idle state 44 and the JTAG controller 74 generates the R-T-I pulse 45. As can be seen in FIG. 5 and due to the double buffering, the memory unit 18 spends very little time in the RDY state.

If a few devices are to be programmed or erased in parallel, pin 72 can be configured with an open drain and all of the devices can connect their RDY/BSY lines to pin 72. Thus, pin 72 will produce a RDY signal only when all of the devices are ready.

It will be appreciated by persons skilled in the art that the present invention is not limited by what has been particularly shown and described herein above. Rather the scope of the invention is defined by the claims that follow:

What is claimed is:

1. A method of controlling the operations of an on-chip, memory unit, the method comprising the steps of:

receiving an indication at least of a ready or busy state of said memory unit;

instructing said memory unit to perform a next operation once the indication is of the ready state;

and wherein said step of receiving includes the steps of capturing said indication and data and address information of a previous byte provided to said memory unit and shifting in data and address information of a next byte and at least one extra bit through a shift register such that said indication is also shifted out of said shift register to a data out pin of a JTAG port, said steps of capturing and shifting repeating until said indication is of the ready state.

2. A method of controlling the operations of an on-chip memory unit, the method comprising the steps of:

receiving an indication at least of a ready or busy state of said memory unit;

instructing said memory unit to perform the next operation once the indication is of the ready state; and also comprising the step of shifting the data and address information of the next byte to be provided to said memory unit into a shift register while said memory unit performs said operation.

3. A method of controlling the operation of an on-chip memory unit, the method comprising the steps of:

receiving an indication at least of a ready or busy state of said memory unit;

instructing said memory unit to perform the next operation once the indication is of the ready state, wherein said step of receiving includes the step of providing said indication from a non-JTAG port of said chip to a pin on a receiving port of an external processor.

4. A method according to claim 3 and wherein said step of receiving includes the step of waiting until said indication is of the ready state.

5. A method according to claim 4 and wherein said step of waiting includes the step of polling said receiving port.

6. A method according to claim 4 and wherein said step of waiting includes the step of interrupting said external processor once said indication is of the ready state.

7. A memory chip comprising:

a memory unit having a ready/busy output line;

a JTAG port for communicating with an external processor and having a JTAG input line and a JTAG output line; and a JTAG controller for controlling the operations of said memory unit in accordance with insrucons from said external processor received via said JTAG port, the controller comprising:

a shift register having an input connected to said JTAG input line and an output connected to said JTAG output line and having a plurality of storage elements one of which is connected to said ready/busy output line and multiplicity of which are available for receiving data and address information of a byte of said memory unit from said JTAG input line;

a buffer for receiving said data and address information from said shift register and for providing such to said memory unit; and a state machine for controlling the operation of said shift register and buffer under instruction from said external processor and for instructing said memory unit to perform the next operation once the ready/busy output line indicates the ready state.

8. A memory chip comprising:

a memory unit having a ready/busy output line;

a JTAG port for communicating with an external processor;

a non-JTAG port connected to said ready/busy output line for providing at least said ready/busy output line to said external processor; and a JTAG controller for controlling the operations of said memory unit in accordance with instructions from said external processor received via said JTAG port.

9. A memory chip according to claim 8 wherein said JTAG port comprises a JTAG input line and a JTAG output line and wherein said JTAG controller comprises:

a shift register having an input connected to said JTAG input line and an output connected to said JTAG output line and having a plurality of storage elements which are available for receiving data and address information of a byte of said memory unit from said JTAG input line;

a buffer for receiving said data and address information from said shift register and for providing such to said memory unit; and a state machine for controlling the operation of said shift register and buffer under instruction from said external processor and for instructing said memory unit to perform a next operation.

10. A system comprising:

a processor having a parallel port; and a memory chip comprising:

a memory unit having a ready/busy output line;

a JTAG port for communicating with said processor;

a non-JTAG port connected to said ready/busy output line and to said parallel port of said processor; and a JTAG controller for controlling the operations of said memory unit in accordance with instructions from said processor received via said JTAG port.

11. A system according to claim 10 and wherein said processor includes means for sensing the state of said ready/busy line via said parallel port and for activating to said JTAG controller when said ready/busy output line indicates that the memory unit is ready.

12. A system according to claim 11 and wherein said means for sensing is an interrupt port.

13. A system according to claim 11 and wherein said means for sensing includes means for polling said parallel port.

14. A system according to claim 10 and wherein said non-JTAG port has an open drain output.

15. A system according to claim 10 wherein said JTAG port comprises a JTAG input line and a JTAG output line and wherein said JTAG controller comprises:

a shift register having an input connected to said JTAG input line and an output connected to said JTAG output line and having a plurality of storage elements which are available for receiving data and address information of a byte of said memory unit from said JTAG input line;

a buffer for receiving said data and address information from said shift register and for providing such to said memory unit; and a state machine for controlling the operation of said shift register and buffer and for instructing said memory unit to perform a next operation under instruction from said processor.

* * * * *